July 26, 1960 C. N. BOODE 2,946,951
TESTING DEVICES
Filed May 27, 1957
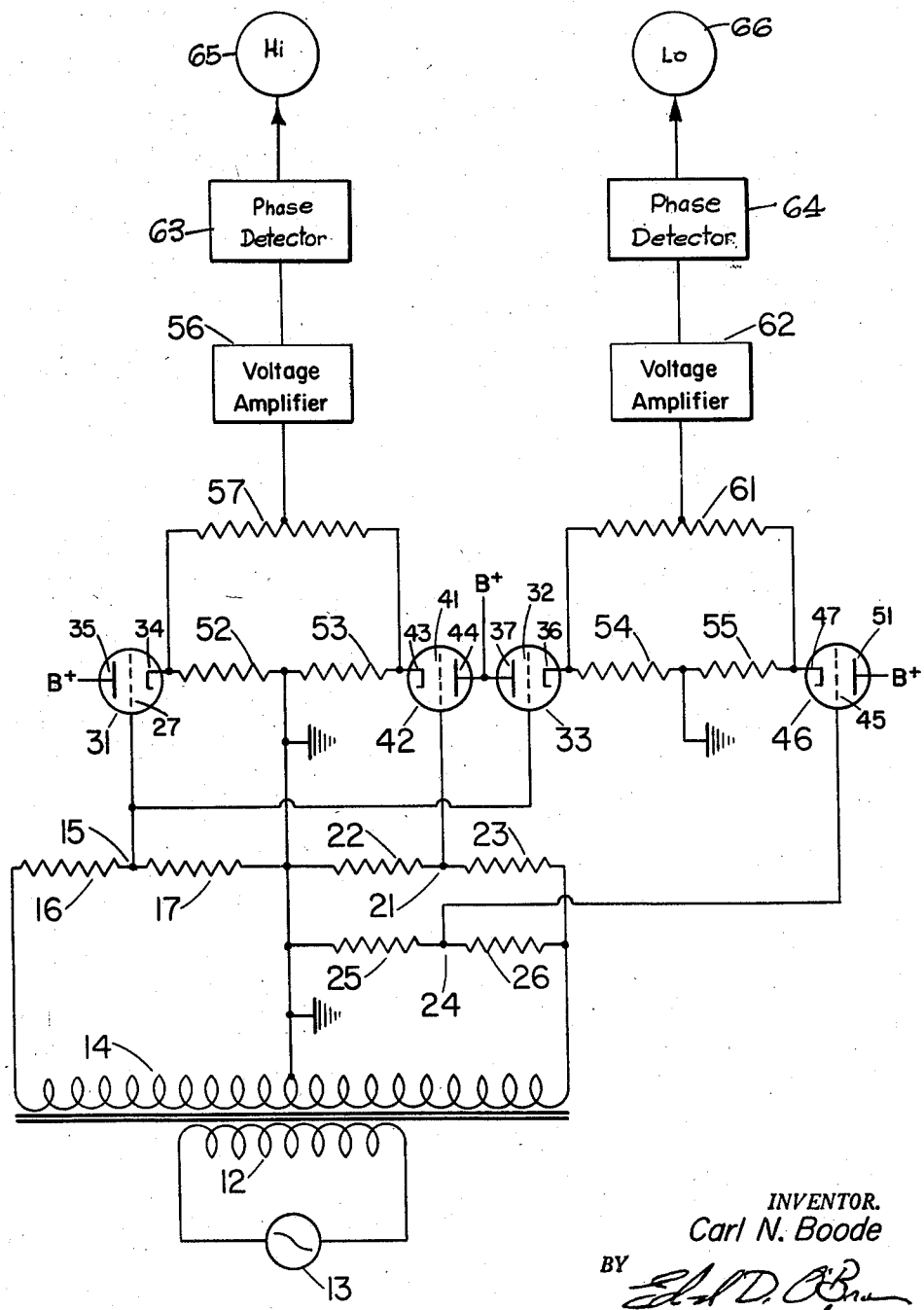
INVENTOR.
Carl N. Boode

United States Patent Office 2,946,951
Patented July 26, 1960

2,946,951
TESTING DEVICES

Carl N. Boode, Riverside, Calif., assignor to Bourns, Inc., a corporation of California Filed May 27, 1957, Ser. No. 661,719

1 Claim. (Cl. 324—62)

This invention relates to electrical testing devices, and more particularly to a resistance testing device adapted to quickly and positively indicate whether the resistance value of a resistor under test falls within pre-set upper and lower limiting values.

The electrical testing device of this invention comprises two voltage dividers each comprising two standard resistors connected across one-half of a center tapped transformer secondary winding and a third voltage divider including the resistor under test and a standard resistor connected across the other half of the transformer winding. The standard resistor included in the third voltage divider is adjusted to some pre-determined tolerance percentage of the nominal value of the resistor under test. The ratios between the resistors comprising the other two voltage dividers are equal to the ratio of plus the allowable percentage of deviation and minus the allowable percentage of deviation respectively. The voltage output from the third voltage divider is compared with the voltage from each of the other dividers, which are 180° out of phase with that from the third divider. Thus, a voltage output from one of the two comparison circuits is produced depending upon whether the resistance of the unknown resistor is greater or less than allowable maximum or minimum percentage. An amplifier amplifies the output voltages from the comparison circuits, while phase detectors and suitable indicators indicate whether the unknown resistor is within predetermined resistance values. It is, therefore, an object of this invention to provide a resistance measuring device for indicating whether a resistor of unknown value falls within pre-determined resistance values.

Another object of this invention is to provide a resistance measuring device providing a "go–no go" type of indication readily understood by untrained personnel.

Another object of this invention is to provide a simple, accurate, compact and inexpensive resistance measuring device.

These and other objects of this invention will be readily apparent upon perusal of the following specification in light of the accompanying drawing wherein an exemplary embodiment of this invention is schematically depicted.

Referring now to the drawing, a transformer 11 is provided with a primary winding 12 connected to a suitable alternating current source 13. Secondary winding 14, provided with a center tap connected to ground, is connected to a plurality of voltage dividers. A first voltage divider 15, consisting of unknown resistor 16 and standard resistor 17, is connected between the center tap and one end of secondary winding 14. A second voltage divider 21, consisting of standard resistors 22 and 23, is connected between the center tap and the other end of secondary winding 14. A third voltage divider 24, comprising standard resistors 25 and 26 is connected in parallel with voltage divider 21.

The center tap of voltage divider 15 is connected to control electrode 27 of electron discharge device 31, to control electrode 32 of electron discharge device 33. Electron discharge device 31 also includes cathode 34 and anode 35. Similarly, electron discharge device 33 includes cathode 36 and anode 37.

The center tap of voltage divider 21 is connected to control electrode 41 of electron discharge device 42, which also includes cathode 43 and anode 44. In a similar manner, the center tap of voltage divider 24 is connected to control electrode 45 of electron discharge device 46, which also includes cathode 47 and anode 51.

Cathodes 34 and 43 of electron discharge devices 31 and 42 are connected to ground through cathode resistors 52 and 53 respectively. Similarly, cathodes 36 and 47 of electron discharge devices 33 and 46 are connected to ground through cathode resistors 54 and 55, respectively. All of anodes 35, 44, 37 and 51 are connected to a suitable direct voltage source, not shown, denoted on the drawing as B+.

A first voltage amplifier 56 is connected to the cathodes 34 and 43 of electron discharge devices 31 and 42 through the center tap of comparator resistor 57. In a similar manner comparator resistor 61, connected between cathodes 36 and 47 of electron discharge devices 33 and 46, is provided with a center tap connected to the input of voltage amplifier 62. Voltage amplifiers 56 and 62 are substantially similar to one another, having similar gain and phase shift characteristics. Output signals from amplifiers 56 and 62 are connected to the input terminals of phase detectors 63 and 64 respectively. The phase detectors 63 and 64 are connected to a suitable reference voltage that is in phase with the bridge circuit voltage. An indicator lamp 65 connected to the output of phase detector 63, provides an indication of an output voltage from phase detector 63 indicating a resistance value higher than the established limits. Similarly, an indication lamp 66 connected to the output of phase detector 64, provides an indication of an output voltage from phase detector 64 indicating a resistance value lower than the established limits.

The alternating voltage applied to voltage divider 15 is equal in magnitude and in phase opposition to the voltage applied to voltage dividers 21 and 24. The resistor of unknown value is connected in voltage divider 15 in the position indicated by numeral 16. The resistance of standard resistor 17 is a predetermined percentage of the nominal, expected value of unknown resistor 16, exemplarily, ten percent. The resistance ratio of standard resistor 22 to standard resistor 23 in voltage divider 21 is selected to be equal to the ratio of the resistance of resistor 17 to the nominal resistance of unknown resistor 16 added to the allowable percent deviation resistance. In a similar manner, the ratio between standard resistors 25 and 26 is equal to the ratio between the value of standard resistor 17 and the nominal value of unknown resistor 16 minus the allowable deviation.

The voltage appearing at the junction of unknown resistor 16 and the standard resistor 17 is compared with the voltage appearing at the junction of standard resistors 22 and 23 by the comparison circuit consisting of electron discharge devices 31 and 42. As is apparent to one skilled in the art, the voltage applied to control electrode 27 is 180° out of phase with the voltage applied to control electrode 41. Further, the voltage applied to control electrode 27 will be smaller than the voltage applied to control electrode 41 if the resistance of unknown resistor 16 is larger than the predetermined maximum, and the voltage applied to control electrode 27 will be larger than the voltage applied to control electrode 41 if the resistance of unknown resistor 16 is smaller than the predetermined maximum. Thus, the voltage appearing at the center tap of comparator resistor 57 will be of one phase if resistor 16 is larger than the allowable maximum, and opposite in phase if smaller than the allowable maximum.

In a similar manner, the voltage appearing at the junction of unknown resistor 16 and standard resistor 17 is compared with the voltage appearing at the junction of standard resistors 25 and 26 by the comparison circuit consisting of electron discharge devices 33 and 46. The voltage applied to control electrode 32 will be smaller than the voltage applied to control electrode 45 if the resistance of unknown resistor 16 is greater than the predetermined minimum. It is apparent, therefore, that the voltage appearing at the center tap of comparator resistor 61 will be of one phase if the resistance of resistor 16 is larger than the allowable minimum and 180° opposed in phase if smaller than the allowable minimum. It will be apparent from the foregoing, therefore, that if unknown resistor 16 falls within both the predetermined upper and lower resistance limits, the voltage applied to voltage amplifiers 56 and 62 will be of the same phase. If the resistance value of the unknown resistor is larger than the predetermined maximum, the voltage applied to amplifier 56 reverses in phase. Similarly, if the resistance value of the unknown resistor is smaller than the predetermined minimum, the voltage applied to amplifier 62 reverses in phase.

Output voltages from amplifiers 56 and 62 are applied to phase detectors 63 and 64, respectively. When resistor 16 falls within the predetermined upper and lower limits, the voltages applied to both phase detectors 63 and 64 are in phase, and no output signal is produced for display on indicators 65 and 66. However, if the resistance value of resistor 16 is larger than the predetermined upper limit, the voltage applied by amplifier 56 reverses in phase, causing a D.C. output signal from phase detector 63, illuminating indicator lamp 65. Similarly, if the resistance value of resistor 16 is smaller than the predetermined lower limit, the voltage applied to phase detector 64 by amplifier 62 reverses in phase, causing a D.C. output signal from phase detector 64, illuminating indicator lamp 66. As will be obvious to those skilled in the art, suitable relay circuits may be employed in addition to, or instead of indicator lamps 65 and 66 illustrated.

While in the foregoing specification there have been set forth in detail a specific embodiment of the resistance testing device of this invention, it will be understood that the principles thereof may be embodied in other and widely varied organizations without departing from the spirit and scope of this invention defined by the appended claim.

I claim:

A testing device for checking a test resistor to determine whether the resistance thereof falls within predetermined upper and lower limits, said device comprising a voltage supply transformer having primary windings connected to a source of alternating current, and a secondary winding having a grounded center tap, said center tap and one end of said secondary winding providing a first output component, and said center tap and the other end of said secondary winding providing a second output component, said first and second output components having a phase difference of 180°, a first voltage divider connected across said center tap and said one end of said secondary, said first voltage divider comprising said test resistor and a first resistor of known value connected together in series, the junction between said test resistor and said first resistor being connected to the grid of each of a first and second triode vacuum tube, an upper limit voltage divider and a lower limit voltage divider connected in parallel between said center tap and said other end of said secondary, said upper limit voltage divider and said lower limit voltage divider each comprising a pair of resistors of known value connected together in series, the junction of said resistors in said upper limit voltage divider being connected to the grid of a third triode vacuum tube, and the junction of said resistors in said lower limit voltage divider being connected to the grid of a fourth triode vacuum tube, said triode vacuum tubes each having an anode connected to a source of D.C. bias voltage and a cathode, the cathodes of said first and third vacuum tubes being connected to ground through cathode resistors, said cathodes of said first and third vacuum tubes being also connected to the ends of a center tapped comparator resistor, the center tap of said comparator resistor being connected to a voltage amplifier and thence to a phase detector, said phase detector being operable to actuate a high-limit indicator, the cathodes of said second and fourth vacuum tubes being connected to ground through other cathode resistors, said cathodes of said second and fourth vacuum tubes being also connected to the ends of a second center tapped comparator resistor, the center tap of said second comparator resistor being connected to a second voltage amplifier and thence to a second phase detector, said second phase detector being operable to actuate a low-limit indicator, said phase detectors being connected to a reference voltage that is in phase with the voltage of their respective secondary output components.

References Cited in the file of this patent

UNITED STATES PATENTS

| | | |
|---|---|---|
| 2,468,625 | Goetz | Apr. 26, 1949 |
| 2,822,518 | Jordan | Feb. 4, 1958 |
| 2,841,765 | Harrold | July 1, 1958 |